W. L. ADAMS.
FISHING REEL.
APPLICATION FILED NOV. 13, 1916.
1,357,670.
Patented Nov. 2, 1920.
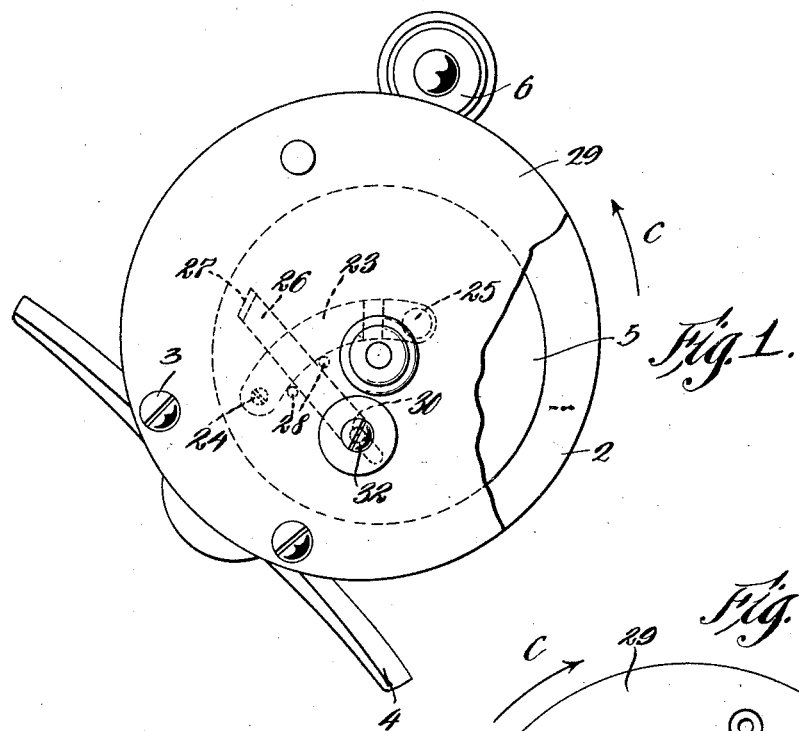
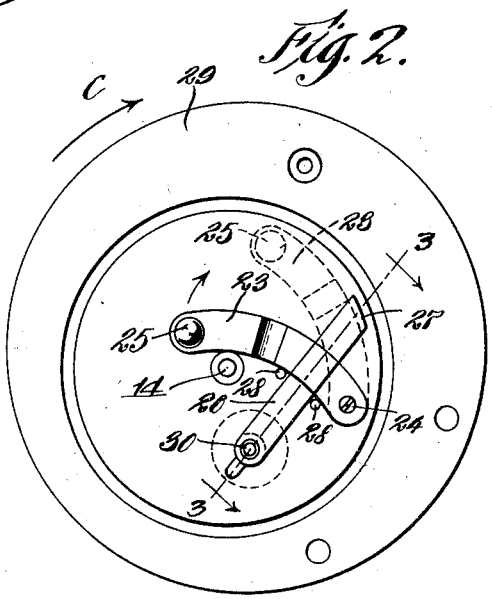
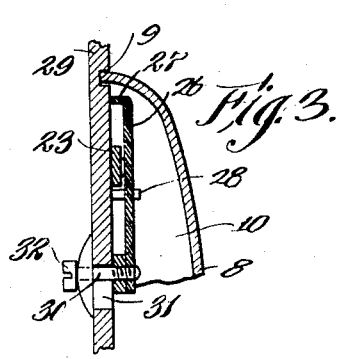
Inventor
Walter L. Adams
By Brockett and Hyde
Attys.

UNITED STATES PATENT OFFICE.

WALTER L. ADAMS, OF AKRON, OHIO, ASSIGNOR TO ENTERPRISE MANUFACTURING COMPANY, OF AKRON, OHIO, A CORPORATION OF OHIO.

FISHING-REEL.

1,357,670.  Specification of Letters Patent.  Patented Nov. 2, 1920.

Application filed November 13, 1916. Serial No. 131,058.

*To all whom it may concern:*

Be it known that I, WALTER L. ADAMS, citizen of the United States, residing at Akron, in the county of Summit and State of Ohio, have invented certain new and useful Improvements in Fishing-Reels, of which the following is a specification.

This invention relates to fishing reels, and more particularly to fishing reels of the free spool type.

The object of the invention is to provide improved means for preventing back lash of the reel, or, in other words, for preventing the spool from rotating faster than the rate at which the line pays out, to thereby maintain a taut line and prevent the line from becoming tangled or reversely wound. A further object of the invention is to provide an improved anti-back lash attachment for fishing reels which serves to retard free rotation of the spool when unwinding the line, but whose retarding action and effect are reduced when reeling in.

Further objects of the invention are in part obvious and in part will appear more in detail hereinafter.

The invention comprises the fishing reel hereinafter described and claimed.

In the drawings, which represent one embodiment of the invention, Figure 1 is an end view; Fig. 2 is a view of the inner face of the end frame plate showing the spool retarding device carried thereby; Fig. 3 is a detail section on the line 3—3, Fig. 2, and Fig. 4 is a detail section, showing the brake arm.

Referring to the drawings, the reel frame may be of any suitable form and is shown as comprising an end plate 29 connected by the usual cross rods or pillars 3 to a gear housing 2, and a base or support 4 attached to said pillars and adapted for connection to the fishing rod. In the frame is the usual spool 5 on which the line is wound. Said spool is journaled at one end in the end plate and at its opposite end is connected to suitable driving gearing (not shown) located in the gear housing and operated by the handle 6.

The spool 5 is provided at its ends with the usual wide shallow bell shaped heads 8 whose peripheral edges travel in annular grooves or tracks 9 of the end plate and gear housing, each of said heads forming a shallow circular cavity 10 between said head and the adjacent end plate or housing, as the case may be. In the cavity between the spool and the end plate 29, is located the anti-back lash attachment to which the present invention relates, and which comprises a suitable arm 23 pivoted at 24 to the end plate 29 and provided at its free end with a friction brake shoe or pressure member 25, which may for example be formed of fiber or some other suitable substance. Pivot 24 is located at any suitable point on the end plate, and is shown as located closely adjacent to the annular groove or track 9 in which the periphery of the spool head travels, although it may lie nearer to the spool axis. The arm 23 may be of any suitable form and is shown as a curved arm extending part way around the outer portion of the cavity 10, the arms being long enough so that the shoe 25 is on the far side of the central spool bearing 14 from the pivot 24. With the arrangement described tilting movement of the arm about its pivot causes the friction shoe 25 to approach or recede from the central bearing 14.

The natural resiliency of the arm 23 holds the brake shoe 25 lightly in contact with the inner surface of the adjacent spool head 8, but when near the axis of the spool the braking effect of shoe 25 is negligible. When said spool is rotated in a direction to wind in the line, which direction is the opposite of that indicated by the arrow C, Fig. 1, the drag of the spool on the brake shoe turns the arm 23 from the position shown in dotted lines, Fig. 2, toward the position shown in full lines in said view. The pressure of the brake shoe is therefore applied nearer to the axis of the spool and, therefore, with a shorter lever arm. Consequently when the line is being wound in the braking effect is diminished and practically negligible resistance is offered to the turning movement of the spool. However, when the spool rotates in the opposite direction during unwinding of the line the dragging effect of the spool on the brake shoe forces or holds it outwardly, so that it moves out along the inner face of the spool head to the peripheral portion of the circular cavity 10 and the friction or pressure is applied to the spool farther from its axis of rotation. An increasing or maximum resistance is therefore offered to the rotation of the spool, preventing it from traveling at a rate faster than the line pays out and maintaining said line taut and preventing it from becoming tangled or reversely wound. The outer braking face of the spool head may be flat but is shown as curved. Therefore, as the brake shoe rides outwardly on said face the pressure is automatically increased by the gradual restriction of the peripheral portion of cavity 10 and the approach of the braking surface of the spool head toward the brake shoe.

The invention also enables the brake to be rendered effective by the movement of the rod in casting because the brake arm is free to swing in either direction, its movement being unimpeded by springs or other devices. It also extends upwardly or away from the base plate 4 which attaches the reel to the fishing pole. When a cast is made with the fishing rod, the sweep of the arm moves the reel in the direction of the arrow "C". When the motion of the rod and reel is arrested at the conclusion of the cast momentum throws the brake arm outwardly from the full line to the dotted line position, Fig. 2. In this latter position the rotating spool engages the brake shoe and by its turning movement tends to force the brake shoe outwardly still farther and increases its friction braking effect upon the curved spool face. Rotation of the spool in the opposite direction throws the brake in toward the center where its effect is negligible.

The outward movement of the brake arm is limited by an adjustable stop shown as a slide 26 having a bent end portion 27 against which the brake arm abuts in its outer position. Said slide moves between two guide pins 28 on the end plate 29 and has a screw 30 passing through an elongated slot 31 in the plate and provided with a head 32 on the outer face thereof. By adjusting the slide lengthwise along said slot the braking effect may be varied by small amounts, it being, of course, understood that the farther said arm moves outwardly, the greater is the restriction of the chamber between the spool and end plate and the greater is the friction of the brake upon the spool.

The fishing reel described is of simple construction and is provided with an effective means of preventing back lash of the spool. It is capable of adjustment from the outside of the reel and its brake exerts full effect when the line is paying out and a reduced or negligible effect when the line is being wound in. It can be manufactured also at low cost and is not liable to get out of order in service.

What I claim is:

1. A fishing reel, comprising a frame having a portion adapted for attachment to the rod, a spool rotatable therein and having an end head provided with a concave outer face, and a brake member pivotally mounted upon said frame and free to swing loosely in a cavity between the frame and spool head, said brake member having a shoe portion and adapted when near to the spool axis to exert negligible braking effect upon the concave spool head and upon a cast with the rod to move outwardly and by frictional contact with the spool head to exert an increasing braking effect.

2. A fishing reel, comprising a frame having a portion adapted for attachment to the rod, a spool rotatable therein and having an end head provided with a concave outer face, a brake member pivotally mounted upon said frame and free to swing loosely in a cavity between the frame and spool head, said brake member having a shoe portion and adapted when near to the spool axis to exert negligible braking effect upon the concave spool head and upon a cast with the rod to move outwardly and by frictional contact with the spool head to exert an increasing braking effect, and means normally out of contact with said braking member but contacted thereby as said member moves outwardly and adjustable by small amounts to vary the amount of its outward movement.

3. A fishing reel, comprising a frame having a portion adapted for attachment to the rod, a spool rotatable therein and having an end head provided with a concave outer face, a brake member pivotally mounted upon said frame and free to swing loosely in a cavity between the frame and spool head, said brake member having a shoe portion and adapted when near to the spool axis to exert negligible braking effect upon the concave spool head and upon a cast with the rod to move outwardly and by frictional contact with the spool head to exert an increasing braking effect, and a member slidably mounted in said frame and normally out of contact with said braking member and adjustable by small amounts and having a stop portion adapted to be contacted by said braking member as it moves outwardly to limit its outward movement and thereby vary its maximum braking effect.

In testimony whereof I affix my signature.

WALTER L. ADAMS.

Witnesses:
C. T. PFLUEGER,
FRANK B. KOEHLAR.